United States Patent [19]
Treglown

[11] 3,868,665
[45] Feb. 25, 1975

[54] GROUND FAULT CURRENT DETECTOR

[75] Inventor: Edward M. Treglown, Martinsville, N.J.

[73] Assignee: Midland-Ross Corporation, Cleveland, Ohio

[22] Filed: Feb. 8, 1974

[21] Appl. No.: 440,833

[52] U.S. Cl. ............................... 340/255, 317/18 R
[51] Int. Cl. .......................................... G08b 21/00
[58] Field of Search..................... 340/255; 317/18 R

[56] References Cited
UNITED STATES PATENTS
| | | | |
|---|---|---|---|
| 3,666,993 | 5/1972 | Legatti | 340/255 |
| 3,699,392 | 10/1972 | Lee | 340/255 |
| 3,757,169 | 9/1973 | Beresnickow | 317/18 R |

Primary Examiner—Thomas B. Habecker

[57] ABSTRACT

A ground fault current monitoring and limiting circuit is connected between an isolated electrical power distribution system and ground. Means are included for connecting the power lines alternately to fault current monitoring and detection means. The last-named means provides a low impedance from a line to ground for low values of fault current. The impedance increases sharply for values of fault current above a predetermined magnitude and a warning is provided when the fault current exceeds such predetermined magnitude.

8 Claims, 4 Drawing Figures

TO FIGURE 1a

GROUND FAULT CURRENT DETECTOR

BACKGROUND OF THE INVENTION

This invention relates to monitoring apparatus for connection between an isolated electrical power distribution system and ground to provide an indication of excessive or dangerous leakage current from the system to ground.

The invention particularly concerns sensitive ground fault detection apparatus for indicating the existence of faults to ground occurring in an isolated A.C. power distribution network which supplies electrical equipment in a medical or hospital environment. In equipment such as patient monitoring or surgical equipment in a hospital operating room, intensive care area, delivery room, or similar area, power is generally supplied through an isolation transformer to minimize injury to a patient if an undesired ground fault occurs on a power line. In an ideal ungrounded electrical power distribution system there is infinite impedance to ground and a single low impedance connection between any point of the system and ground will cause no current to flow from the system to ground. A practical installation, however, exhibits finite impedances to ground because of capacitive impedances to ground and finite insulation resistances. In a practical system, therefore, a low resistance connection to ground will produce a "fault current" from the system to ground.

Ground fault detectors are provided to give warning with minimum delay of the presence of a ground fault on the system. A practical ground fault detector, however, will itself introduce a finite impedance between the system and ground. A ground fault detector should continuously monitor the fault current and provide an indication when such fault current exceeds a predetermined level. Further, a ground fault detector should be equally sensitive to balanced or unbalanced grounding faults of any configuration of resistive or capacitive impedances. It is desirable also to provide means whereby the fault current through the detector may be limited by the detector itself. In prior ground fault detecting devices which accomplish one or more of these objectives, detection and current limiting circuits are generally provided for each individual power line and tend to be complex and expensive.

SUMMARY OF THE INVENTION

A general object of this invention is to provide an improved ground fault detector apparatus which includes all of the characteristics mentioned above.

Another object is to provide such a ground fault detector apparatus which is simple in construction compared to prior such apparatus, effective in use and economical to manufacture.

These and other objects of the present invention are attained by the provision in a detector for sensing ground currents above a predetermined magnitude in either of a pair of isolated power lines and for limiting the ground current of means providing a variable impedance path to ground for the ground currents. The variable impedance means provides a low impedance at low values of ground currents which increases with increasing magnitude of ground current to a maximum at values of ground current slightly above the predetermined magnitude. Alarm means are provided responsive to values of ground current in the variable impedance path above the predetermined magnitude for producing an alarm indicating excessive ground current. Switch means is provided between each of the power lines and the variable impedance path. A bistable means synchronized to the frequency of the power lines provides signals to trigger the switch means alternately into conduction on alternate cycles of the power line frequency. The power lines are thereby connected alternately on alternate cycles of the power line frequency to the variable impedance means to cause ground currents from either power line above the predetermined magnitude to be detected and limited.

DESCRIPTION OF A PREFERRED EMBODIMENT

Figure 1:
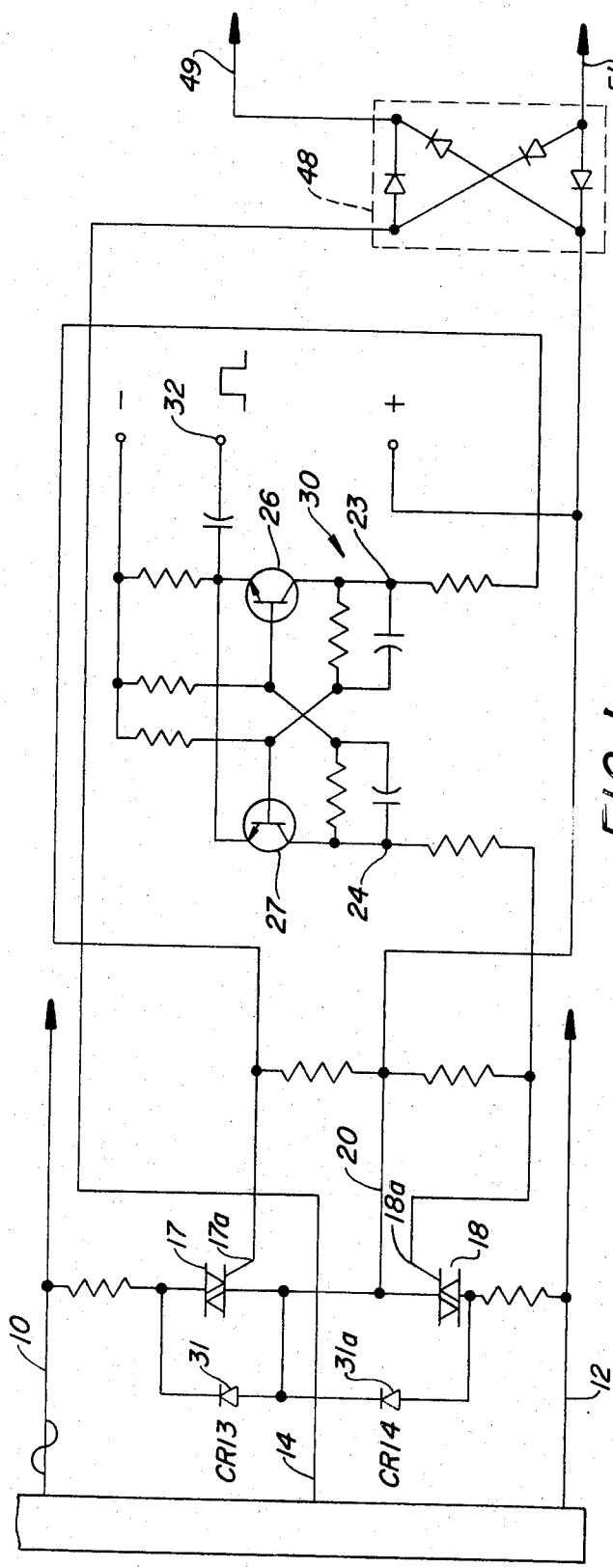
FIGS. 1 and 1a are schematic drawings of electrical apparatus embodying the present invention.

Referring initially to FIG. 1, the numerals 10 and 12 indicate a pair of lines carrying or delivering power to a load (not shown) such as a patient monitoring unit or other electronic device in a hospital or medical service area. The numeral 14 indicates a reference or ground potential line from which the power lines 10 and 12 are isolated electrically such as by supplying the lines 10 and 12 through an isolation transformer. Despite such isolation there exists, as described above, finite impedances, both capacitive and resistive, from each of the power lines 10, 12 to ground line 14. Such finite impedances give rise to fault currents which, under the proper circumstances, can be a danger to patients utilizing the equipment supplied through power lines 10 and 12.

A detector embodying the present invention is provided to detect such fault currents, provide an alarm for those above a predetermined magnitude and limit the currents through the detector to peak values slightly above the predetermined magnitude of current which results in an alarm.

The detector apparatus includes switching means in the form of triacs 17 and 18 connected between power lines 10 and 12, respectively, and a common line 20. The gates 17a, 18a of triacs 17 and 18 are connected to collectors 23 and 24, respectively, of transistors 26 and 27 which form a flip-flop or bistable multivibrator generally indicated at 30. Flip-flop 30 provides triggering signals alternately to the gate electrodes of triacs 17 and 18 to render the triacs conductive and thereby connect power lines 10 and 12 alternately to common line 20. Diodes 31 and 31a are connected across triacs 17 and 18, respectively, to eliminate spikes in the leakage current which may be introduced if the triacs are not switched at exactly the 0 volt point in the line voltage.

Each power line is switched to common line 20 at a rate dependent upon the rate at which flip-flop 30 is switched from one to the other of its two stable states. Flip-flop 30 is connected as a counter and switching is effected by applying a positive-going signal at input terminal 32 which causes whichever of transistors 26 or 27 is conductive to be rendered non-conductive and thereby switch the flip-flop to its opposite stable state. Each transistor 26, 27 is switched through a full cycle from one state to the same state as a result of two consecutive signals applied to input terminal 32. The output signals produced at each of collectors 23 and 24 occur, therefore, at half the rate of the input signals applied at terminal 32.

Figure 2:
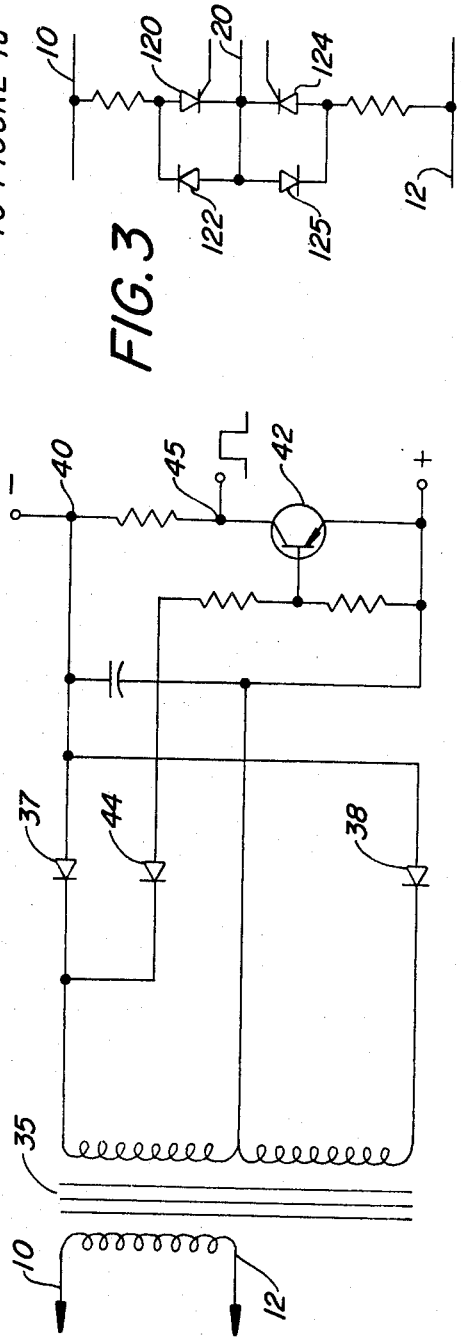
FIG. 2 is a schematic drawing of an electrical circuit for providing pulses to the circuit of FIG. 1 to synchronize its operation to the power line frequency.

The signals provided to input terminal 32 of the flip-flop are produced by the circuit shown in FIG. 2. The signal from the power lines 10, 12 is coupled through a transformer 35 and the signal at the secondary is rectified by diodes 37 and 38 to provide a negative D.C. voltage supply at terminal 40 for a transistor 42. The negative-going half cycles of the signal are also passed through diode 44 to the base of transistor 42 and render the transistor conductive for substantially the entire half cycle. Transistor 42 thereby produces a positive-going pulse at the beginning of each cycle of the A.C. signal.

The signal appearing at the collector 45 of transistor 42 is supplied to input terminal 32 of flip-flop 30. The output or gate triggering signals from flip-flop 30 thus occur on alternate cycles of the power line frequency so that power lines 10 and 12 are switched alternately to common line 20 on alternate cycles of the power line frequency.

Figure 1A:
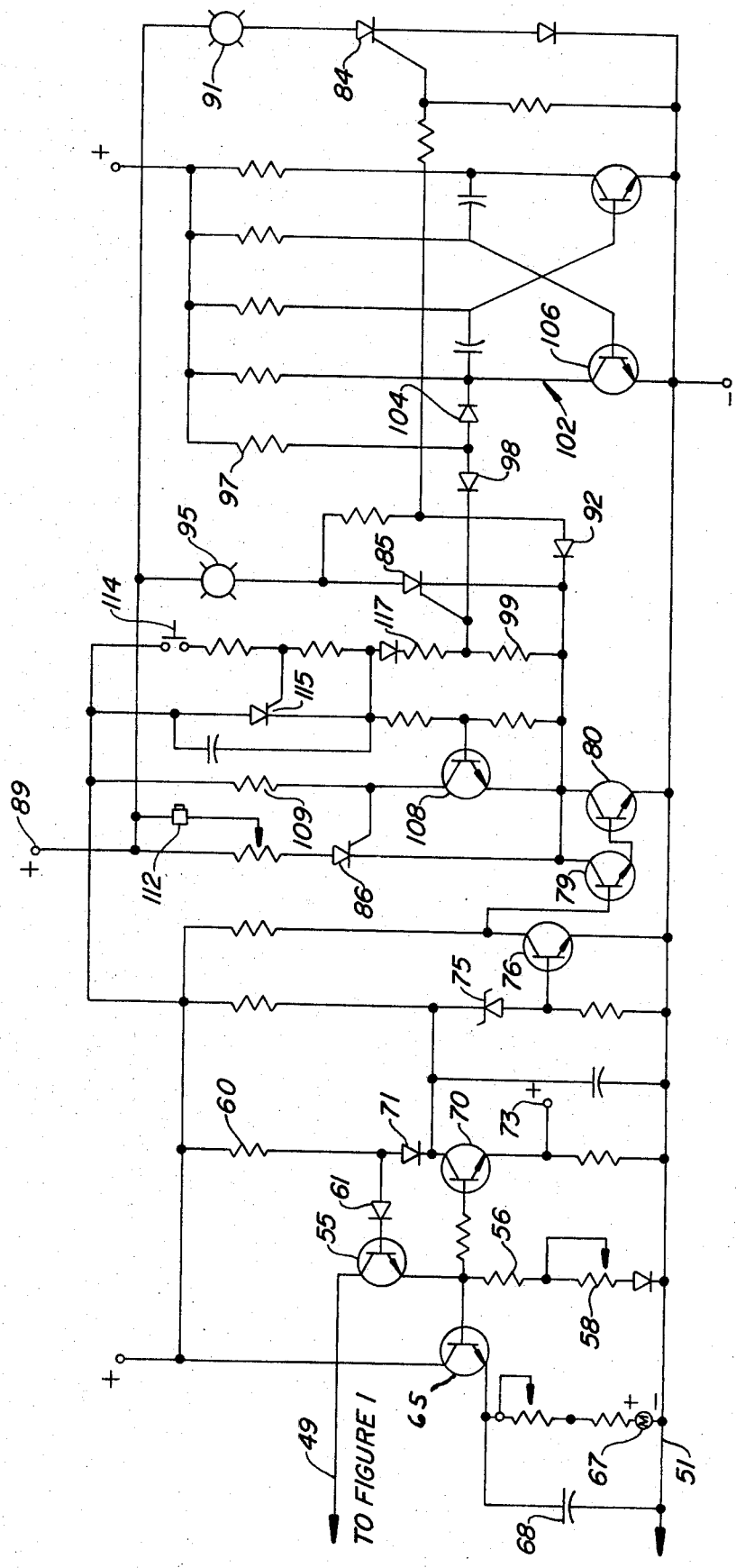

The common line 20 is connected through a full wave rectifier generally indicated by the numeral 48 to the line 49 and the detecting and limiting portion of the illustrated embodiment of the present invention which is shown in FIG. 1a. Ground fault current from either power line 10, 12 thus flows through common line 20, is rectified in full wave rectifier 48 and passed through line 49 to the detector and limiter circuit shown in FIG. 1a. From the detector and limiter circuit fault current passes to line 51 and returns through rectifier 48 to ground line 14. In passing through the detecting and limiting circuit shown in FIG. 1a such fault currents are detected and limited as described below.

Referring now to FIG. 1a, line 49 is connected to the collector of a detecting and limiting transistor 55. The emitter of transistor 55 is connected through resistor 56 and variable resistor 58 to line 51. Fault current from each of lines 10 and 12 thus flows through transistor 55, resistors 56 and 58 and to ground line 14. The impedance in the fault current path is determined by the internal impedance of transistor 55 and the resistance of resistors 56 and 58. The internal impedance of transistor 55 is determined by the conductive bias supplied thereto.

Since the impedance of the detector fault current path is, in effect, in series with any fault impedance between power lines 10 or 12 and ground line 14, if the detector impedance were of a value very close to the fault impedance the fault current would be reduced in the detector to a deceptively low value which might not be sufficient to produce an alarm in the detector even though the fault impedance itself was of such a value as to produce an out-of-limit fault current at the power line voltage. For this reason, the impedance in the fault current path for values of current below that at which an alarm is produced is selected to be no greater than one-tenth of the minimum fault impedance at which alarm is desired to be produced. At higher peak values of fault current since an alarm will already have been given, the detector and current limiter acts to increase its own impedance in the fault current path to limit the fault current through itself to a maximum slightly above the value at which an alarm is given.

In the circuit of FIG. 1a, the initial low impedance is provided by biasing transistor 55 into saturation through resistor 60 and diode 61. For low values of fault current transistor 55 is thus biased into saturation and the impedance in the fault current path is determined essentially by the values of resistor 56 and variable resistor 58. Variable resistor 58 is adjusted to make the impedance of the fault current path in the detector no greater than one-tenth of the minimum fault impedance at which an alarm should occur as described above.

A voltage proportional to the value of the fault current is developed across resistors 56 and 58. An emitter follower 65 is connected to the emitter of transistor 55 with a meter 67 connected in its emitter circuit. A capacitor 68 is connected across the emitter circuit of the emitter follower. The arrangement is such that the peak value of fault current can be read on meter 67 while emitter follower 65 prevents loading of the emitter circuit of transistor 55.

A control transistor 70 has its base connected to the emitter of transistor 55 and its collector connected through diode 71 to resistor 60 through which biasing current is supplied to the base of transistor 55. A constant positive bias is applied to the emitter 73 of transistor 70 and, at low values of fault current, the transistor is nonconductive. As fault current increases above a predetermined magnitude the potential at the emitter of transistor 55 becomes more positive and transistor 70 becomes conductive and diverts biasing current from the base of transistor 55 thereby increasing the impedance in the fault current path. Further increases in fault current further increase the conduction of transistor 70 which decreases the conductive bias on transistor 55 and further increases the impedance in the fault current path until the fault current is finally limited to a maximum value. In this way the detector impedance is increased to such an extent as to substantially eliminate any contribution by the detector to the fault current.

An alarm indicating an excessive fault current is produced when the fault current reaches a predetermined magnitude which is indicated by the voltage at the collector of transistor 70 falling to a particular level. Above that level the voltage at the cathode of zener diode 75 is such that it is conducting in the zener region and provides a conductive bias to the base of transistor 76. When the voltage level at the collector of transistor 70 falls to a level indicating an excessive fault current, the voltage across zener diode 75 falls below the zener value causing transistor 76 to cease conducting and thereby turn on transistors 79 and 80.

The conductive state of transistor 80 controls the conductive state of controlled rectifiers 84, 85 and 86. Each of these controlled rectifiers is supplied from a voltage source 89 which is unfiltered and therefore has a substantial A.C. component. The unfiltered pulsating voltage becomes sufficiently negative on each half cycle such that the current through each controlled rectifier falls below the holding current and tends to render the controlled rectifier nonconductive. Each controlled rectifier, however, is controlled by a constant bias applied to its gate such that if the gate is forward biased the controlled rectifier for practical purposes remains conductive continuously even though its current falls temporarily below its holding current required to maintain conduction. If the gate is biased below the trigger voltage, however, the controlled rectifier remains nonconductive when the current through it falls below the holding current.

Controlled rectifier 84 controls the illumination of a green "ready" light 91 which is lighted when a fault current is below the predetermined magnitude. The gate of controlled rectifier 84 is connected through a diode 92 to the collector of transistor 80 and is forward biased when the transistor is not conducting and reverse biased, or biased below its triggering voltage, when the transistor is conducting. Controlled rectifier 85 controls a red "fault" light 95 which is lighted when an excessive ground current is detected. The gate of controlled rectifier 85 is forward biased through resistor 97, diode 98, resistor 99 and transistor 80 when the transistor is conducting. Even when transistor 80 is conducting, however, the gate of controlled rectifier 85 is periodically reverse biased during one state of an astable multivibrator generally indicated as 102. This happens when the gate biasing current of controlled rectifier 85 is diverted from the gate and diode 98 through diode 104 and conducting transistor 106 of the astable multivibrator. The repetition rate of astable multivibrator 102 is such that lamp 95 flashes on and off at a rate of about one cycle per second. A flashing of the lamp calls attention to the excessive fault current which has been detected.

A path is provided for current through controlled rectifier 86 by conduction of transistor 80. Transistor 108 which is connected to the gate of controlled rectifier 86 is normally not conducting so that the gate is forward biased through resistor 109. Controlled rectifier 86 is, therefore, rendered conductive when transistor 80 becomes conductive and turns on an audible alarm such as a horn 112.

After the audible alarm 112 and the flashing warning light 95 have been detected by personnel, a switch 114 can be depressed to forward bias the gate of controlled rectifier 115 and cause it to conduct through transistor 80. Conduction by controlled rectifier 115 forward biases transistor 108 causing it to conduct and ground the gate of controlled rectifier 86. Controlled rectifier 86 is turned off on the next negative-going portion of its supply voltage 89 to quiet audible alarm 112. Conduction by controlled rectifier 115 also provides a steady forward bias to the gate of controlled rectifier 85 through resistor 117 so that fault warning light 95 is held continuously on rather than flashing at a rate determined by astable multivibrator 102.

In operation, each power line 10, 12 is switched on alternate full cycles of the power line frequency to common line 20. Fault current from each line to ground is rectified in rectifier 48, flows to line 49 and through limiting and detecting transistor 55 to line 51 and returns through rectifier 48 to ground line 14. So long as the fault current from both power lines to ground is below a predetermined magnitude selected by setting resistor 58, transistor 55 remains fully conductive and the impedance provided to the fault current is very low. An increase in the fault current in either or both lines to a value above the predetermined magnitude will cause transistor 70 to become conductive and divert biasing current from the base of transistor 55, thereby increasing the impedance provided to the fault current. The peak values of fault current can be read on meter 67.

When transistor 70 becomes conductive the voltage at the cathode of zener diode 75 drops so that the base of transistor 76 is back-biased and the transistor is cut-off thereby causing transistors 79 and 80 to become conductive. Conduction by transistor 80 reverse biases the gate of controlled rectifier 84 causing it to be turned off on the next negative-going portion of its supply voltage as described above and turn off ready light 91. Conduction by transistor 80 also provides a current path for controlled rectifier 85 which conducts for periods determined by astable multivibrator 102 and causes alarm light 95 to flash. Controlled rectifier 86 is also turned on by transistor 80 and turns on audible alarm 112. The flashing alarm light 95 and audible alarm 112 provide a definite indication of an out-of-limit ground fault current.

The audible alarm can be turned off and the flashing of alarm light 95 eliminated in the manner described above by depressing switch 114 to turn on controlled rectifier 115 which provides a continuous forward biasing current path for the gate of controlled rectifier 85. Controlled rectifier 86 which controls audible alarm 112 is rendered nonconductive when transistor 108 conducts and causes the gate of controlled rectifier 86 to be reverse biased.

With the detector circuit in this condition the source of the ground fault can be determined and eliminated. When the fault current again drops below the predetermined magnitude, transistor 70 is again rendered essentially nonconductive, the potential at the cathode of zener diode 75 increases and transistor 76 is again rendered conductive. Transistors 79 and 80 are thereby cut-off so that controlled rectifiers 85, 86 and 115 are cut-off and the gate of controlled rectifier 84 is again forward biased to turn on the controlled rectifier and its associated ready light 91.

Figure 3:
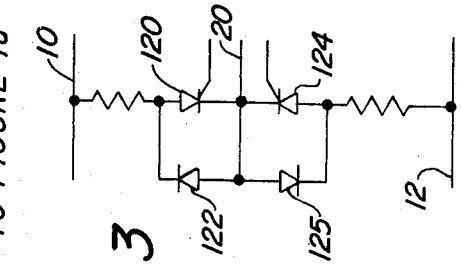
FIG. 3 is a schematic drawing of an alternate circuit arrangement for part of the apparatus of FIG. 1.

FIG. 3 shown a switching current which can be used in place of triacs 17 and 18 to switch each power line 10, 12 to common line 20. A controlled rectifier 120 connected in inverse parallel with a diode 122 permits connection of power line 10 to common line 20 for a full cycle of the power line voltage. A like arrangement of controlled rectifier 124 and diode 125 permits connection of power line 12 to common line 20. Controlled rectifiers 120 and 124 are triggered alternately by flip-flop 30 on alternate cycles of the power line frequency in the same manner that triacs 17 and 18 are triggered as described above.

While a preferred embodiment of the present invention has been disclosed herein in detail, it will be apparent to those skilled in the art that modifications and improvements may be made to the embodiment herein specifically disclosed without departing from the spirit and scope of the invention. Accordingly, this invention is not to be limited to the precise embodiment herein specifically disclosed nor in any other way inconsistent with the progress in the art promoted by this invention.

What is claimed is:

1. A detector for sensing ground currents above a predetermined magnitude in either of a pair of isolated power lines and for limiting said ground current, said detector comprising,
    means providing a variable impedance path to ground for said ground currents, said variable impedance means providing a low impedance path at low values of ground current and increasing with increasing magnitude of ground current to a maximum at values of ground current slightly above said predetermined magnitude, alarm means responsive to values of ground current in said variable impedance path above said predetermined magnitude for providing an alarm indicating excessive ground current, switch means between each of said power lines and said variable impedance path, and bistable means synchronized to the frequency of said power lines for providing signals to trigger said switch means alternately into conduction on alternate cycles of the power line frequency, whereby said power lines are connected alternately on alternate cycles of the power line frequency to said variable impedance means to cause ground currents from either power line above said predetermined magnitude to be detected and limited.

2. A detector as claimed in claim 1 wherein said variable impedance means includes a full wave rectifier having its input connected between the common output of said switching means and ground, a first transistor connected to said rectifier to provide a normally low impedance path for ground currents and a second transistor coupled to said first transistor so as to decrease the conductive bias on said first transistor in response to increasing values of ground current in said first transistor.

3. A detector as claimed in claim 2 wherein said first transistor has its collector coupled to one output terminal of said rectifier and its emitter coupled through a resistance to the other output terminal of said rectifier, said first transistor being normally biased into conduction, said second transistor having its base coupled to the emitter of said first transistor and its collector coupled to the base of said first transistor, whereby increasing values of ground current in said first transistor increase the conductive bias on said second transistor and cause it to divert conductive biasing current from said first transistor and thereby increase its impedance.

4. A detector as claimed in claim 1 wherein the low impedance provided by said variable impedance means at low values of ground current is no greater than one-tenth of the minimum fault impedance at which an alarm is to be produced.

5. A detector as claimed in claim 1 wherein said switch means includes a triac connected between each of said power lines and said variable impedance means.

6. A detector as claimed in claim 1 wherein said bistable means includes a bistable multivibrator and circuit means triggering said multivibrator from one to another stable state on each cycle of the power line frequency, said multivibrator triggering one and the other of said switch means into conduction on alternate changes of state.

7. A detector as claimed in claim 1 further comprising a meter for reading the peak values of ground current.

8. A detector as claimed in claim 1 wherein said alarm means includes audible alarm means and visual alarm means, said visual alarm means having a first state providing a periodic visual alarm indication and a second state providing a steady visual alarm indication, said audible alarm means and said periodic state of said visual alarm means being produced initially in response to detection of a ground current exceeding said predetermined magnitude, and means for turning-off said audible alarm means and switching said visual alarm means to said second state to limit said alarm means to a steady visual alarm indication.

* * * * *